United States Patent
Kobayashi et al.

(10) Patent No.: US 6,236,425 B1
(45) Date of Patent: May 22, 2001

(54) IMAGE PRINTING APPARATUS USING PLURALITY OF LASER BEAMS

(75) Inventors: Shinya Kobayashi, Mito; Kunio Sato, Hitachi; Asahiko Kikuchi, Hitachiota, all of (JP)

(73) Assignees: Hitachi, Ltd.; Hitachi Koki Co., Ltd., both of Tokyo (JP)

( * ) Notice: Subject to any disclaimer, the term of this patent is extended or adjusted under 35 U.S.C. 154(b) by 0 days.

(21) Appl. No.: 09/070,769

(22) Filed: May 1, 1998

(30) Foreign Application Priority Data

May 12, 1997 (JP) .................................... 9-120817

(51) Int. Cl.⁷ .................................... B41J 2/435
(52) U.S. Cl. .................. 347/237; 347/247; 358/444
(58) Field of Search .................. 347/131, 237, 347/240, 247, 251, 256; 358/443, 444, 448, 451, 457, 456

(56) References Cited

U.S. PATENT DOCUMENTS

| | | | |
|---|---|---|---|
| 5,005,139 | 4/1991 | Tung | 358/1.1 |
| 5,436,644 * | 7/1995 | Motoi et al. | 347/256 |
| 5,578,819 | 11/1996 | Kataoka et al. | 250/235 |
| 5,652,660 * | 7/1997 | Seto et al. | 347/131 |
| 5,729,358 * | 3/1998 | Uchiyama et al. | 358/451 |
| 5,764,377 * | 6/1998 | Nacman et al. | 358/444 |
| 5,982,508 * | 11/1999 | Kashihara | 358/456 |

FOREIGN PATENT DOCUMENTS

| | | |
|---|---|---|
| 8-15623 | 1/1996 | (JP) . |
| 8-310057 | 11/1996 | (JP) . |

OTHER PUBLICATIONS

Applied Physics, vol. 16, No. 7 (1996), pp. 676–785 '95 Mitsubishi Simiconductor Data Book, edited by ASSP.

* cited by examiner

*Primary Examiner*—N. Le
*Assistant Examiner*—Hai C. Pham
(74) *Attorney, Agent, or Firm*—Antonelli, Terry, Stout & Kraus, LLP

(57) ABSTRACT

In order to realize edge smoothing in an image printing apparatus using a plurality of laser beams, commonality of a data processing circuit to the plurality of laser beams is attained by obtaining image data for the plurality of scanning lines in synchronism with a common scanning position of one of the plurality of laser beams and storing the image data into a common memory and generating laser modulating data for each of the laser beams; temporarily the laser modulating data for the other laser beams into FIFOS; using the laser modulating data in synchronism with the respective scanning positions of the plurality of laser beams to generate laser modulating signals for the respective laser beams in a PWM.

8 Claims, 13 Drawing Sheets

| | DETECTED SIGNAL | VDie | REMARKS |
|---|---|---|---|
| (1) | c3(f~3) | | NO CORRECTION (WITH DELAY) |
| (2) | Ei1, Ei2 | | CORRECTION OF SLANTING LINE NEARLY VERTICAL |
| (3) | Ei3, Ei4 | | CORRECTION OF SLANTING LINE NEARLY VERTICAL |
| (4) | Ei5, Ei6 | | CORRECTION OF SLANTING LINE NEARLY HORIZONTAL |
| (5) | Ei7, Ei8 | | CORRECTION OF SLANTING LINE NEARLY HORIZONTAL |

(i = 1, 2, 3, 4)

IMAGE PRINTING APPARATUS USING PLURALITY OF LASER BEAMS

BACKGROUND OF THE INVENTION

The present invention relates to an image printing apparatus using a plurality of laser beams (multi-laser beam), and more particularly, the invention relates to art edge smoothing circuit for use in an image printing apparatus.

Image printing apparatuses using a laser beam can print with a higher speed and a higher resolution compared to printing apparatuses of other types, and, accordingly, are widely used. In the past, in a image printing apparatus of this type, a semiconductor laser generating a laser beam having a wavelength of 780 nm has been used, and the printing beam spot diameter becomes 50 to 100 μm when using a general scanning optical system, and, consequently, the resolution of the printing apparatus becomes 300 to 600 dpi. However, as discussed in a paper presented in Applied Physics of Japan, Vol. 16, No. 7 (1996) pp 676–785, the printing beam spot diameter can be decreased to nearly one-half of the conventional printing beam spot diameter by using a GaN semiconductor laser which generates a laser beam having about one-half of the wavelength (420 nm) of the conventional semiconductor laser. Therefore, an image printing apparatus having a higher resolution can be obtained when using such a laser.

However, in this case, the printing speed of the image printing apparatus is decreased, because the scanning beam density has to be increased at the same time. For example, when an image printing apparatus having a scanning beam density of 300 dpi is changed so as to have a scanning beam density of 600 dpi, the printing speed becomes one-half. Although the printing speed can be increased by doubling the rotating angular speed of the rotating polygon mirror for deflecting the laser beam in the image printing apparatus, it is difficult to further increase the rotating speed because the rotating speed is already at the upper limit of the speed range in the high speed printing apparatus. Therefore, Japanese Patent Application Laid-Open No. 8-15623, has proposed an image printing apparatus wherein high speed or high resolution can be attained by increasing the number of laser beams performing the scanning exposure.

On the other hand, in regard to an image printing apparatus using one laser beam, an image quality improving method has been proposed in Japanese Patent Application Laid-Open No. 8-310057, which calls for smoothing a slanting portion in an outline of a character or an image so as not to generate jags by making use of the characteristics that an image printing apparatus using a laser beam can modulate laser intensity continuously in the main scanning direction and can increase or decrease the toner attaching quantity depending on the laser intensity.

FIG. 2 is a block diagram showing a typical system in which a common image printing apparatus is used. A user forms page description data 202 identifying contents of pages to be printed using a data forming apparatus 201, such as a computer. On starting printing, the page data 202 is transmitted to a controller 203 of the image printing apparatus through a network or the like. The controller 203 expands the page description data 202 for every page on a bit map memory as image data 204. Therein, it is assumed that the image printing apparatus is a monochromatic binary laser printer, and the image data 204 is binary data corresponding to 1-pixel per 1-bit. When the expansion of the image data 204 is completed, the controller 203 starts an engine 205 of the image printing apparatus, and then transmits the image data 204 to the engine 205 in response to a synchronous signal 206 received from the engine 205. The engine 205 prints an actual image on a print medium according to the image data 204.

FIG. 3 is a block diagram of an image printing apparatus using one laser beam. This image printing apparatus has an edge smoothing circuit 301 connected between the controller 203 and the engine 205, as disclosed in Japanese Patent Application Laid-Open No. 8-310057. The edge smoothing circuit 301 may be installed inside the controller 203 or inside the engine 205. Therein, among the synchronous signals 206 transmitted from the engine 205 to the controller 203, a signal for synchronizing a scanning position of the laser beam on the scanning line with the image data 204 is referred to as a line synchronous signal BD. Each of a plurality of laser beam detectors is arranged at a position just before a position starting each line of printing. The line synchronous signal BD is a signal generated when the laser beam being deflected and scanned passes through the laser beam detector. The edge smoothing circuit 301 receives the line synchronous signal BD, a pixel clock signal DCLK in synchronism with the image data 204, a high frequency pixel clock signal HCLK and an image data signal VD, and outputs a laser modulating image data signal enhanced for edge smoothing.

FIG. 4 shows a timing chart for each of the signals iin the controller 203. Signal forming with such timing can b,e performed by inputting a clock signal CLK of 50 MHz into an IC (M66235FP: a product of Mitsubishi Electric Corp.) when the printing speed of the image data 204 in the engine 205 is assumed to be 25 M pixels/second (reference: '95 Mitsubishi Semiconductor Data Book, edited by Digital ASSP).

The clock signal CLK of 50 MHz generated by an external quartz oscillator is continuously input to the IC (M66235PF). The line synchronous signal BD is input from the engine 205 out of synchronism with the clock CLK. The IC (M66235PF) generates a clock signal HCLK by synchronizing the phase of the clock CLK with the line synchronous signal BD with a delay represented by a time period of ΔT and a clock signal DCLK having one-half frequency of the clock signal HCLK. Accuracy of the synchronization is ±3 nsec, which is sufficient when taking it into consideration the fact that the frequency of the pixel clock signal DCLK is 25 MHz. The image signal VD is transmitted to the edge smoothing circuit 301 in synchronism with the pixel clock signal DCLK with 1-pixel per 1-bit signal d0 (d2, . . . ).

FIG. 5 shows the construction of an edge smoothing circuit 301 in the conventional apparatus (Japanese Patent Application Laid-Open No. 8-310057). The edge smoothing circuit 301 can be roughly divided into a line memory 501, a logic circuit 502 and a pulse width modulation circuit (hereinafter, referred to as PWM) 503. Although the detailed operation is to be described later, an outline thereof is as follows.

The line memory 501 temporarily stores image data signals VD for a plurality of scanning lines, and transfers image data signals VD of pixels to be printed (reference pixels) and several pixels around the reference pixels to the logic circuit 502 as a single unit. The logic circuit 502 judges by template matching what edge the reference pixels compose a part of, and the judged result is transferred to the PWM 503. The PWM 503 generates enhanced image data (laser modulation) signals Vde for printing the reference pixels by adding appropriate pulse width modulation based on the judged result.

FIG. 6 is a block diagram showing the construction of an image printing apparatus using a plurality of laser beams. This image printing apparatus is composed of a controller 601 and a printer engine 602. A detailed description will be omitted here, since the details are disclosed in Japanese Patent Application Laid-Open No.815623. The controller 601 supplies the engine 602 with image data signals VD1 to VD4 in synchronism with line synchronous signals BD respectively corresponding to plural laser beams.

FIG. 7 is a perspective view showing the construction of an optical system in an engine 701 of an image printing apparatus of the electrophotographic printing type. Here, it is assumed that the image printing apparatus uses four laser beams 701. The four laser beams 701 must be incident onto a rotating polygon mirror 702 by providing four lasers, as disclosed in Japanese Patent Application laid-Open No.6149346, or by splitting one laser beam into four laser beams. As shown in the figure, the four laser beams 701 are focused onto the surface of a photosensitive drum 703 to form beam spots, and the beam spots are deflected and scanned in a main scanning direction (an axial direction of the photosensitive drum). Since there are four laser beams 701, four scanning lines 704 can be printed during one scanning. Since the rotating drum 703 is rotating, the direction transverse to the rotating direction of the photosensitive drum 703 is the sub-scanning direction.

On the photosensitive drum 703, if we let the laser beams 701 from the upstream side of the sub-scanning direction be laser beam (1) to laser beam (4), respectively, and let scanning positions of the respective laser beams be scanning position laser beam (1) 706 to scanning position laser beam (4) 709, then four line synchronous signals BD are generated by one scanning since each of the laser beais (1) to (4) crosses over a beam detector 705 in the top front position during the one scanning. The first one is a line synchronous signal BD1 produced by the laser beam (1), and then follows a line synchronous signal BD2 produced by thus laser beam (2), a line synchronous signal BD3 produced by the laser beam (3), and a line synchronous signal BD4 produced by the laser beam (4).

In FIG. 6, the engine 602 transmits a compound line synchronous signal BD of the line synchronous signals BD1 to BD4 to the controller 601. The controller 601 splits the received line synchronous signal BD into the four line synchronous signals BD1 to BD4. The method of splitting the compound signal is disclosed in Japanese Patent Application Laid-Open No. 8-15623. The controller 601 transmits image data signals VD1 to VD4 respectively synchronized with the line synchronous signals to the engine 602 as printing (laser modulating) signals respectively corresponding to the laser beams (1) to (4).

SUMMARY OF THE INVENTION

The edge smoothing means in the conventional image printing apparatus (Japanese Patent Application Laid-Open No. 8-310057) is for an image printing apparatus using one laser beam, and is not considered to be applicable to an image printing apparatus using a plurality of laser beams. Particularly, the signal processing for the edge smoothing is performed by judging, with relation to pixels around reference pixels, at what edge the reference pixels are positioned. However, in an image printing apparatus in which pixels on an adjacent scanning line are printed by another laser beam in parallel, the signal processing for the edge smoothing cannot be performed merely by using the conventional controller and the conventional edge smoothing circuit.

An object of the present invention is to provide an edge smoothing circuit for performing smoothing so as not to generate jags on slanting lines of an outline of a character or an image in an image printing apparatus using a plurality of laser beams.

Another object of the present invention is to realize the above-mentioned edge smoothing circuit by means of a simple circuit construction.

In an image printing apparatus for printing a plurality of scanning lines in parallel using a plurality of laser beams, when only the image data for one scanning line to be printed is directly generated, the image data of an adjacent scanning line in the sub-scanning direction necessary for smoothing is output in a different scanning cycle. Therefore, a logic processing for effecting smoothing cannot be executed.

The present invention solves the above-mentioned problems. First, the present invention is characterized by an image printing apparatus comprising a control circuit for generating a plurality of laser modulating signals which respectively control a plurality of laser beams based on image data for a plurality of scanning lines, and the plurality of scanning lines are printed in parallel using the plurality of laser beams, wherein the control circuit includes an edge smoothing circuit comprising a memory for storing image data for the plurality of scanning lines which is read out in synchronism with a, scanning position of one of the plurality of laser beams; a logic circuit for generating laser modulating data for the plurality of scanning lines to control the plurality of laser beams based on the image data. for the plurality of scanning lines and pre-stored template patterns in synchronism with the, scanning position a memory for storing the laser modulating data for the plurality of scanning lines in synchronism with the scanning position of the common scanning region and for reading out the stored laser modulating data in synchronism with respective scanning positions of the plurality of laser beams; and a modulator for generating laser modulating signals for the plurality of scanning lines based on the laser modulating data in synchronism with the respective scanning positions of the plurality of laser beams.

Second, the present invention is characterized by the fact that the memory comprises a line memory for storing image data having a number of scanning lines and for outputting the image data with a delay of several scanning cycles, the number being smaller than the number of scanning lines of the template pattern by one; and a pixel memory for storing the obtained image data for the plurality of scanning lines and the image data output from the line memory by a plurality of pixels each.

BRIEF DESCRIPTION OF THE DRAWINGS

These and other objects, features and advantages of the present invention will be understood more clearly from the following detailed description when taken with reference to the accompanying drawings, wherein.

DETAILED DESCRIPTION OF THE PREFERRED EMBODIMENTS

Figure 8:
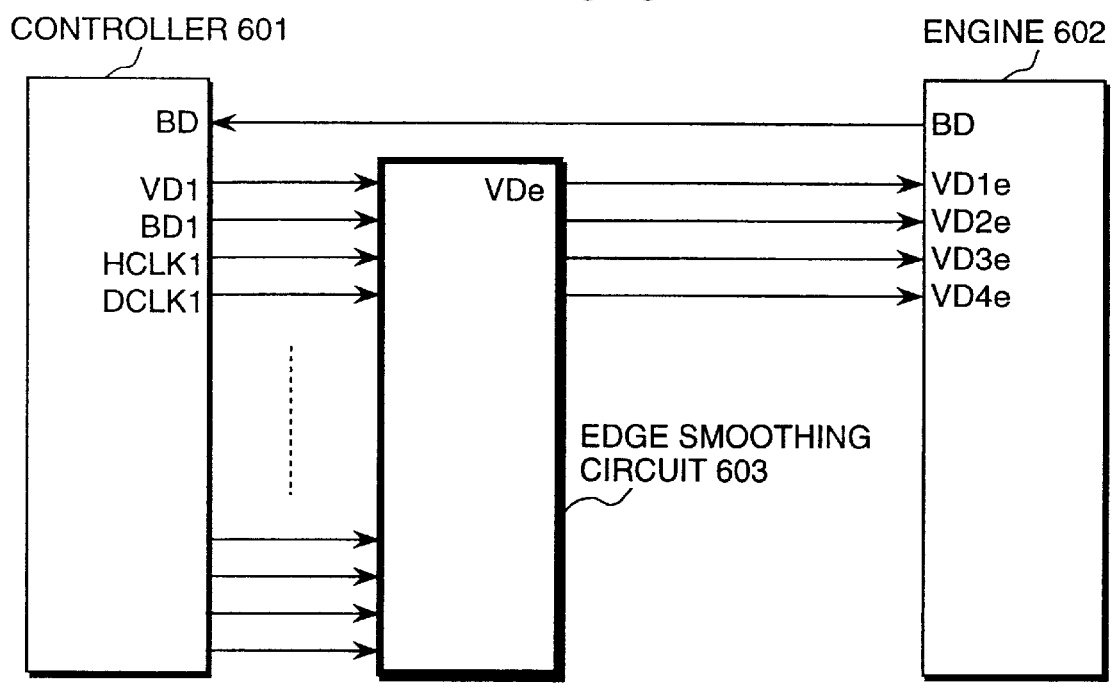
FIG. 8 is a block diagram showing the construction of an embodiment of an image printing apparatus in accordance with the present invention.
Figure 9:
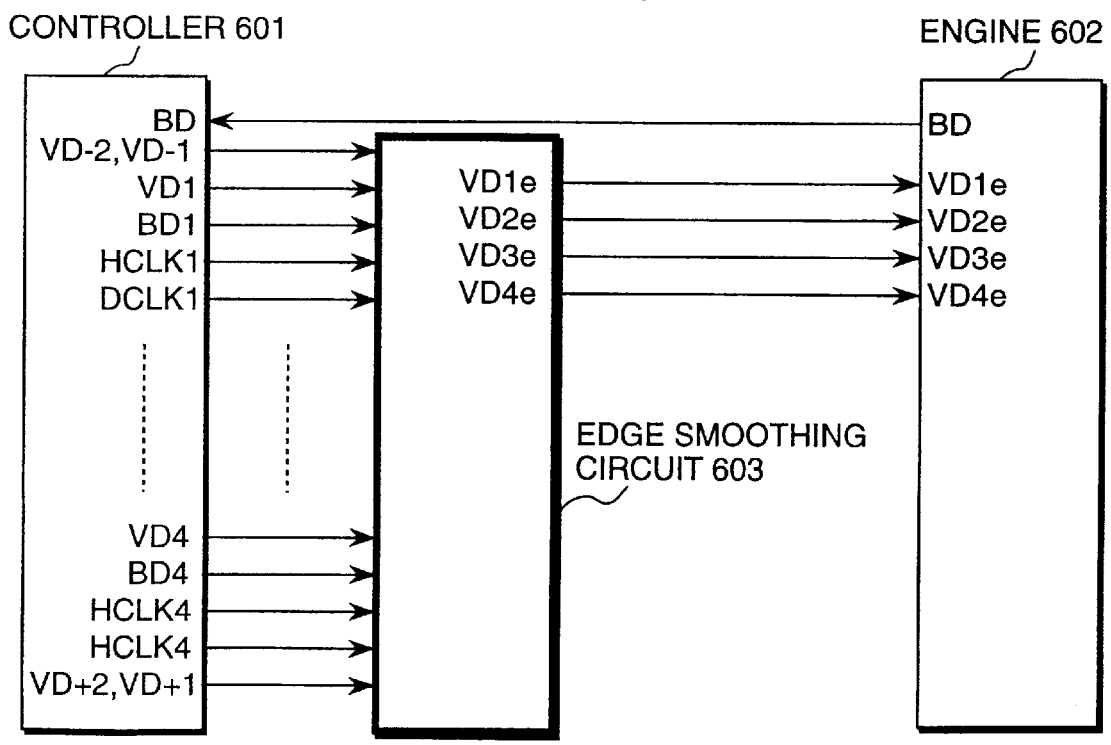
FIG. 9 a block diagram showing the construction of another embodiment of an image printing apparatus in accordance with the present invention.

Embodiments of the present invention will be described below, with reference to FIG. 1 and FIG. 8 to FIG. 19. FIG. 8 is a block diagram showing the construction of an embodiment of an image printing apparatus in accordance with the present invention. The image printing apparatus has an edge smoothing circuit 603 connected between a controller 601 and a printer engine 602.

Similar to a controller in an image printing apparatus not having any edge smoothing function, the controller 601 outputs image data signals VD1 to VD4 and transmits line synchronous signals BD1 to BD4, pixel clock signals DCLK1 to DCLK4 and high frequency pixel clock signals HCLK1 to HCLK4 corresponding to laser beams (1) to (4) to the edge smoothing circuit 603, respectively. The edge smoothing circuit 603 generates image data (laser modulating) signals VD1e to VD4e which are enhanced in order to perform edge smoothing for the respective laser beams (1) to (4) and then transmits them to the engine 602.

Figure 7:
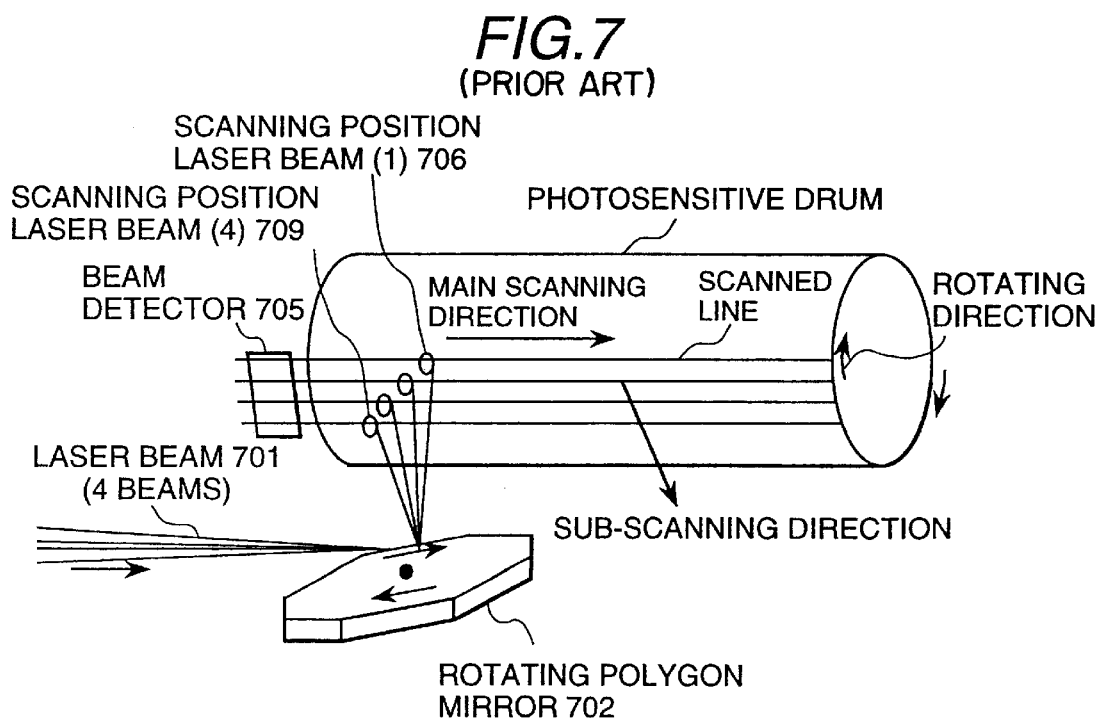
FIG. 7 is a perspective view showing the construction of an optical system in an engine of an image printing apparatus using a plurality of laser beams.

The engine 602 is constructed similar to the engine in the conventional apparatus described with reference to FIG. 7, and prints a plurality of scanning lines 704 in parallel by controlling the image data signals VD1e to VD4e, that is, causing the four laser beams (i) (i=1 to 4) to flash on and off.

Figure 10:
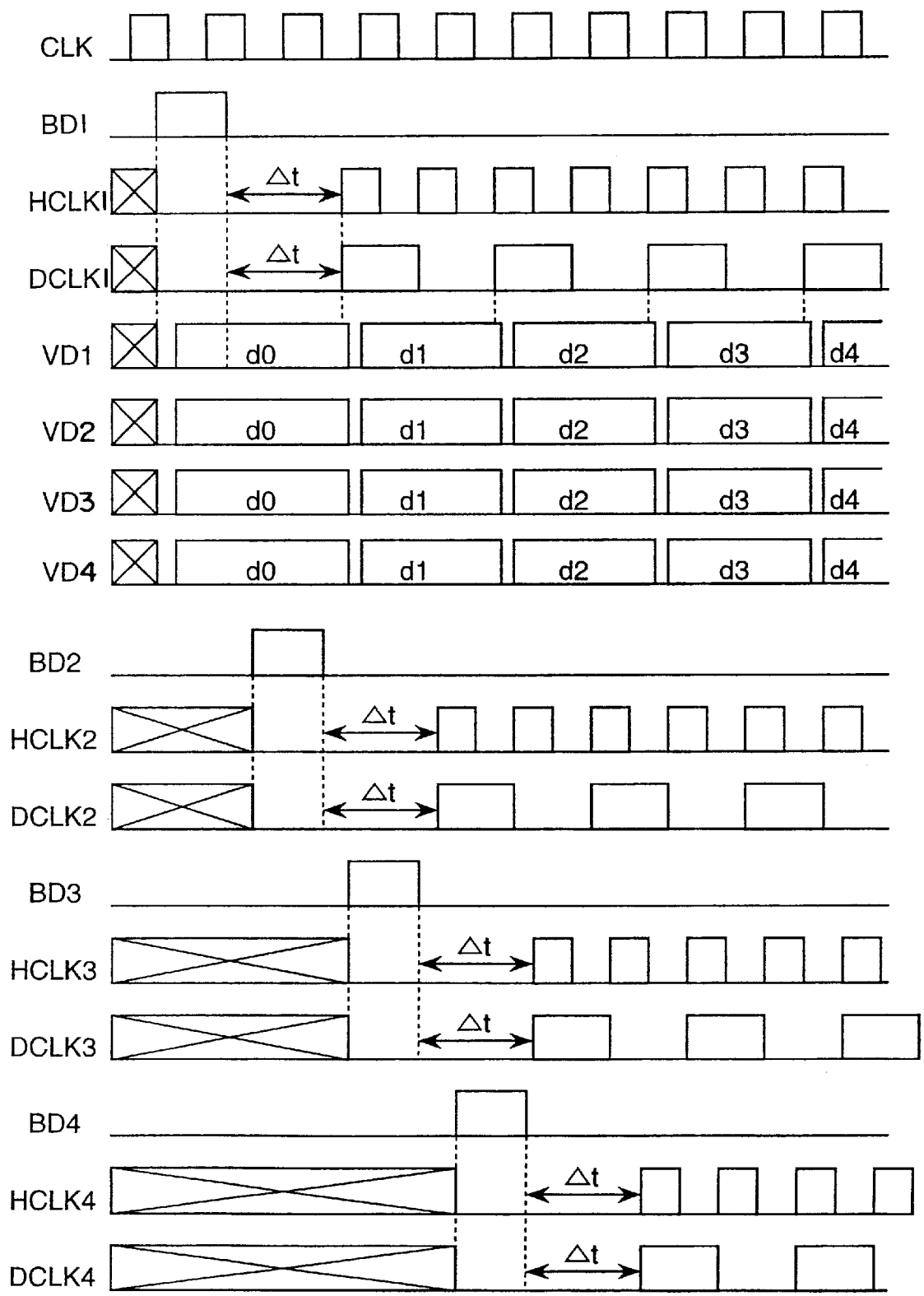
FIG. 10 is a timing chart showing an example of operation signals in the image printing apparatus in accordance with the present invention shown in FIG. 8.

FIG. 10 is a timing chart showing an example of the operation signals in the image printing apparatus in accordance with the present invention as shown in FIG. 8. All the image signals VD1 to VD4 to the respective laser beams (1) to (4) are in synchronism with the pixel clock signal DCLK1. Originally, the image data is expanded in a bit map memory on a page basis inside the controller 601, but not on a laser beam basis. Therefore, since the image data for the four scanning lines, as it is, can be read out from the bit map memory and can be output together in parallel, the image data signals VD1 to VD4 can be output at the timing as shown in the figure.

Figure 1:
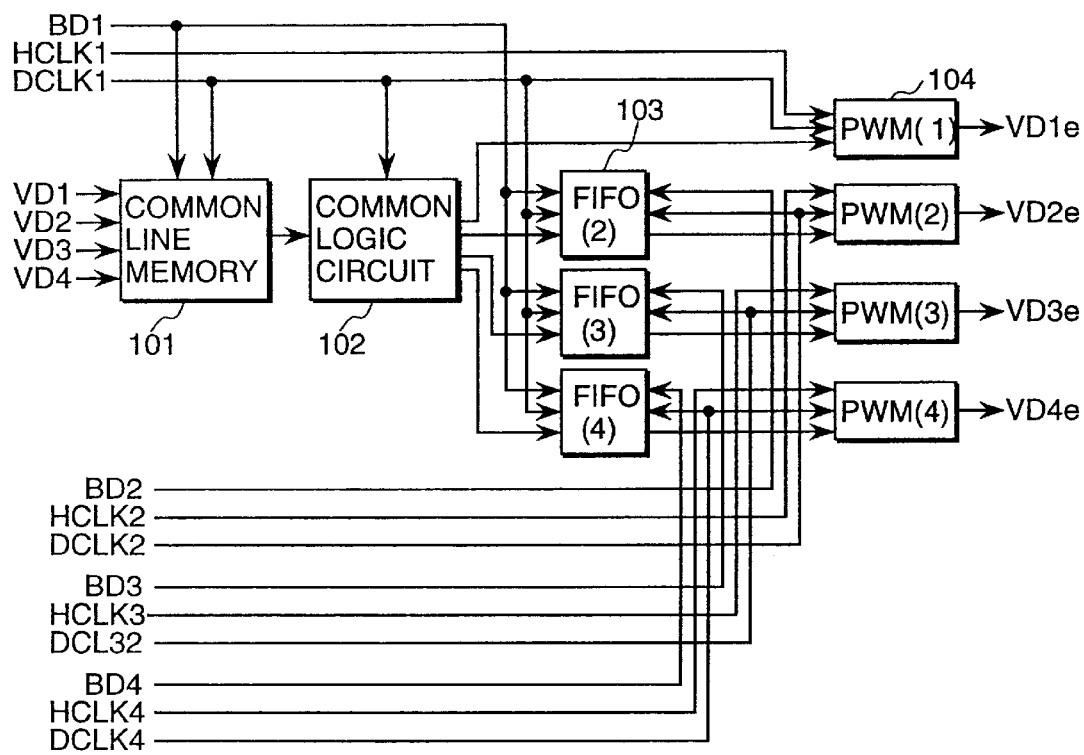
FIG. 1 is a block diagram showing the construction of an edge smoothing circuit for use in an image printing apparatus using a plurality of laser beams in accordance with the present invention.
Figure 2:
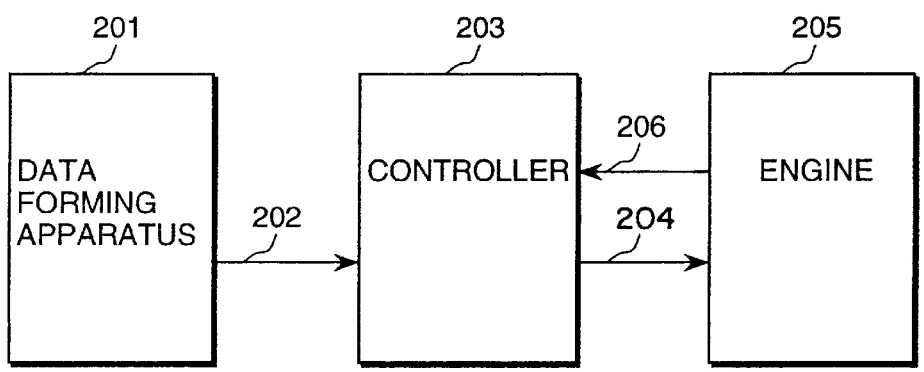
FIG. 2 is a block diagram showing a typical system in which a common image printing apparatus is used.
Figure 3:
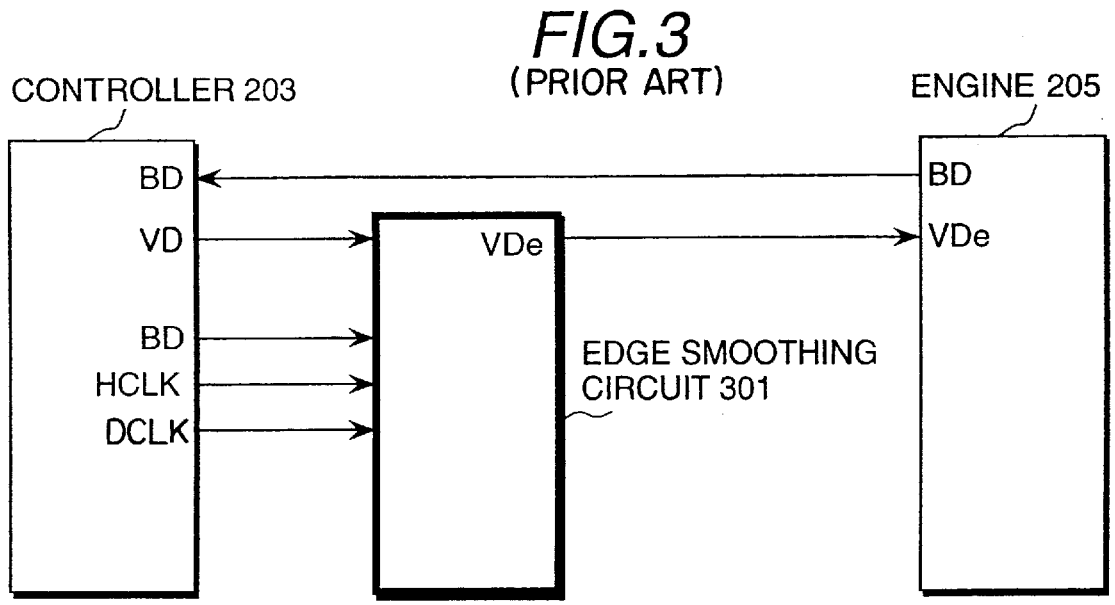
FIG. 3 is a block diagram showing the construction of an image printing apparatus using one laser beam.
Figure 4:
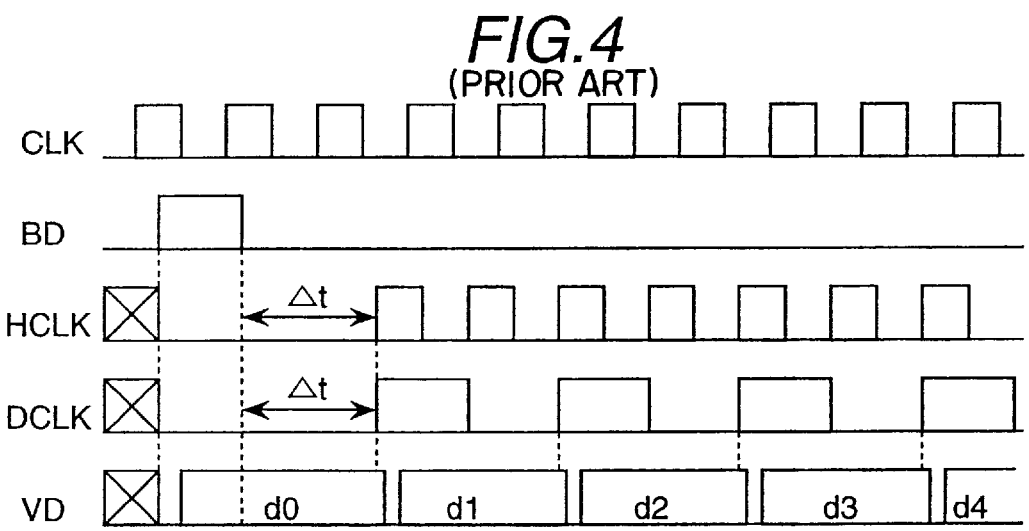
FIG. 4 is a timing chart of signals in the controller of the image printing apparatus shown in FIG. 3.
Figure 5:
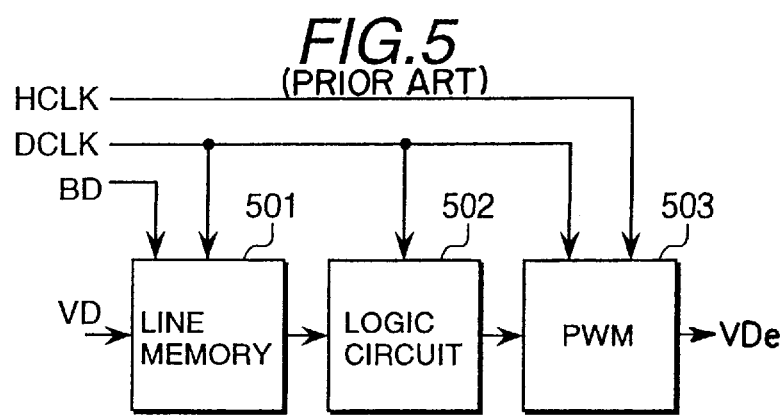
FIG. 5 is a block diagram showing the construction of an edge smoothing circuit in a conventional image printing apparatus using one laser beam.
Figure 6:
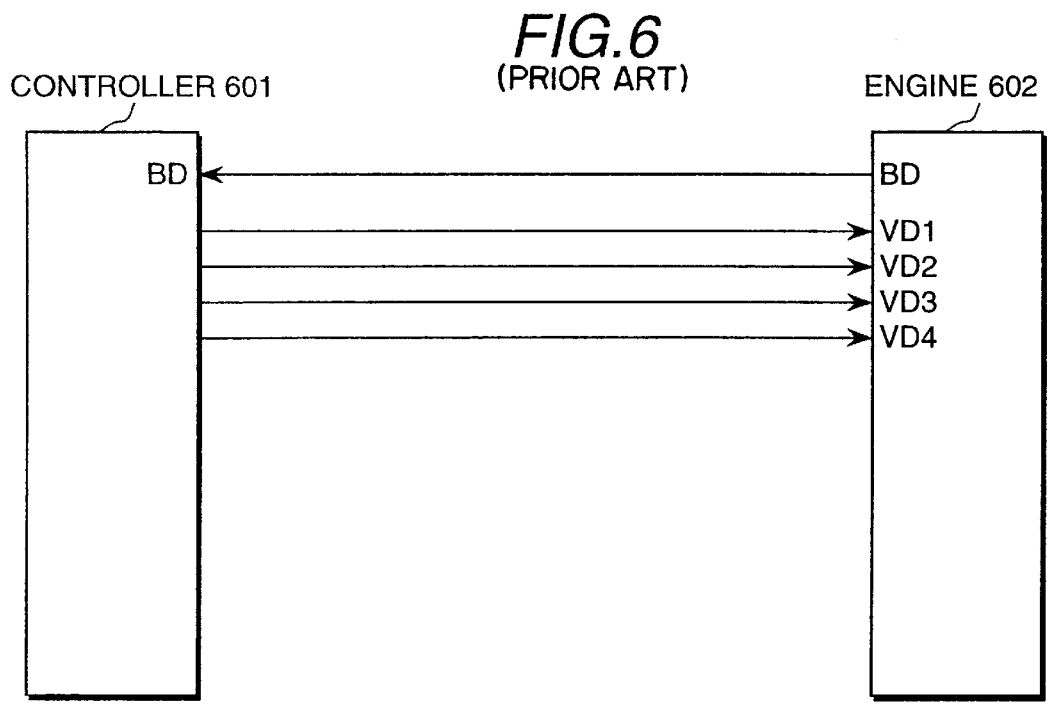
FIG. 6 is a block diagram showing the construction of an image printing apparatus using a plurality of laser beams.

FIG. 1 is a block diagram showing the construction of an embodiment of the edge smoothing circuit 603 in the image printing apparatus using a plurality of laser beams in accordance with the present invention. The edge smoothing circuit 603 is characterized in that the line memory 501 and the logic circuit 502 in the conventional edge smoothing circuit shown in FIG. 5 are replaced by a common line memory 101 and a common logic circuit 102 for common use, and first-in first-out memories (hereinafter, referred to as FIFO) (2), (3), (4) are inserted between the common logic circuit 102 and PWM(2), PWM(3), PWM(4) 104 for the laser beams (2) to (4). The controller 601 may output the image data signals VD1 to VD4 which are similar to image data signals output from a controller not having any edge smoothing circuit in an image printing apparatus. Each of the portions will be described below.

All the image data signals VD1 to VD4 for printing the four scanning lines shown in FIG. 10 are transmitted to the edge smoothing circuit 603 in synchronism with the pixel clock signal DCLK1. In the controller 601, the image data signals VD1 to VD4 can be obtained by directly reading out the image data for the four scanning lines expanded on a page basis in the bit map memory in parallel.

Since all the image data signals VD1 to VD4 are synchronized with the pixel clock signal DCLK1, the edge smoothing circuit 603 can perform batch signal processing as described below.

Figure 11:
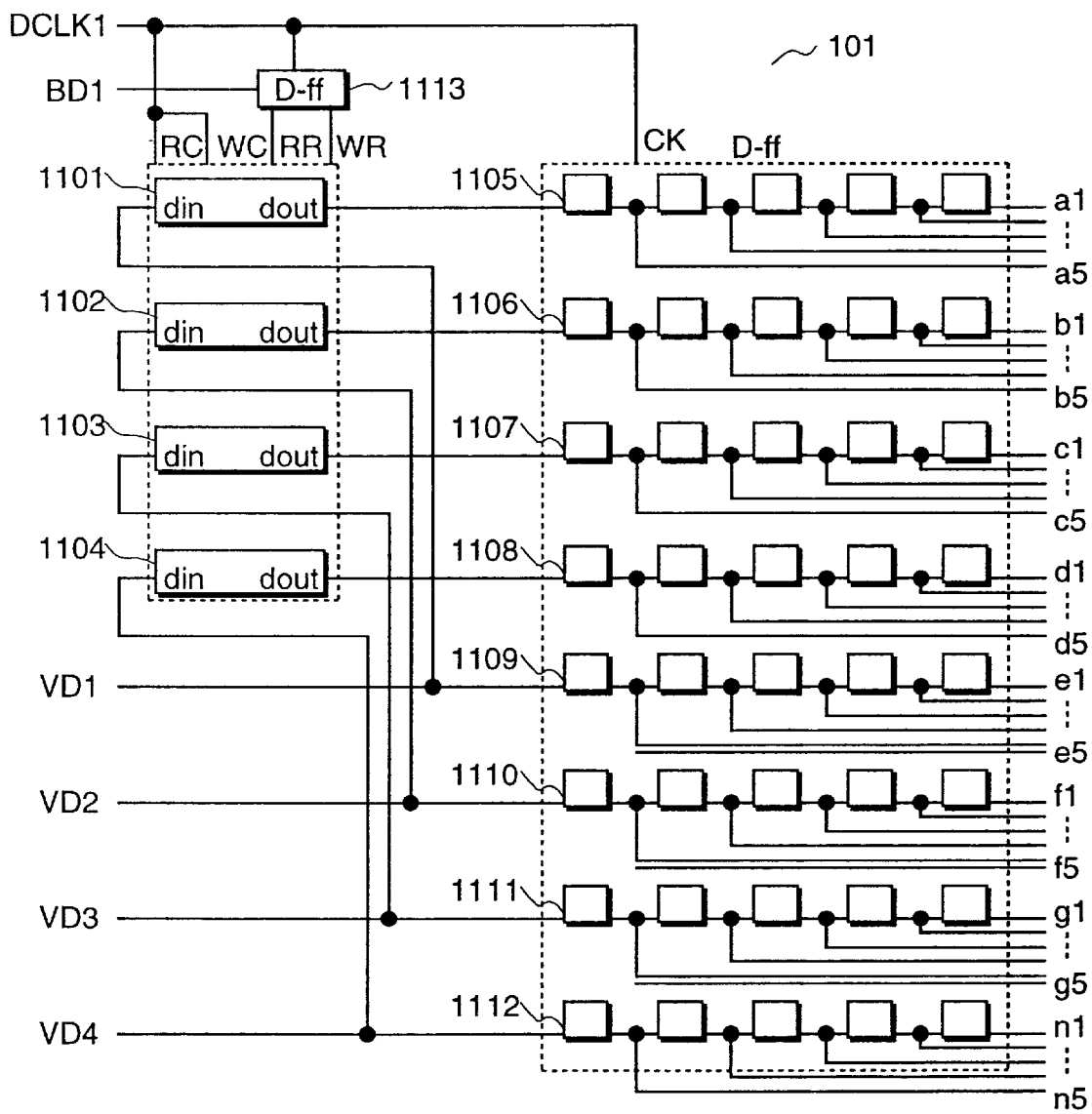
FIG. 11 is a block diagram showing the construction of the common line memory in the image printing apparatus in accordance with the present invention shown in FIG. 8.

FIG. 11 is a block diagram showing an embodiment of the construction of the common line memory 101. The common line memory 101 comprises four line memories 1101 to 1104, which respectively store the image data signals VD1 to VD4 for the four scanning lines and outputs them with a delay of one scanning cycle; and pixel memories 1105 to 1112, which respectively store the image data signals delayed by one scanning cycle output from the four line memories 1101 to 1104 and the image data signals VD1 to VD4 newly input from the controller 601 for five pixels in the main scanning direction, and then outputs them in parallel. The image data signals VD1 to VD4 newly input in synchronism with the pixel clock signal DCLK1 are input to input terminals din of the four line memories 1101 to 1104 and to the pixel memories 1109 to 1112, respectively, and are stored in synchronism with the pixel clock signal DCLK1.

Each of the four line memories 1101 to 1104 can be constructed by employing a well-known line memory IC, such as, for example, an IC HM530281R (a product of Hitachi, Ltd.). Each of the four line memories 1101 to 1104 independently comprises a write counter and a read counter which are controlled by reset signals WR, RR and count clocks WC, RC, respectively. The contents of the counters are write address and read address, respectively. The pixel clock signal DCLK1 is input to the count clocks WC, RC. The reset signals WR, RR are signals which are the line synchronous signal BD1 delayed by a delay time corresponding to an appropriate number of pixels using a D-type flip-flop (hereinafter, referred to as D-ff) 1113 while being synchronized with the pixel clock signal DCLK1. Thus, the data signals output from output terminals clout of the four line memories 1101 to 1104 become image data signals whose positions in the main scanning direction are the same as those of the current image data signals VD1 to VD4 input from controller 601, and the positions thereof in the sub-scanning direction are on the downstream side of the image data signals by four scanning lines. In other words, the data signals which are output from the output terminals dout are the respective image data signals delayed by one scanning cycle, that is, the image data signals at the time before the current scanning cycle. The delayed image data signals output from the output terminals clout of the four line memories 1101 to 1104 are input to and stored in the pixel memories 1105 to 1108 in synchronism with the pixel clock signal DCLK1.

Each of the pixel memories 1105 to 1112 is constructed by connecting five D-ffs, operated in synchronism with the pixel clock signal DCLK1 in series, and signals respectively stored in the pixel memories are output at one time as a1 to a5, b1 to b5, c1 to c5, d1 to d5, e1 to e5, f1 to f5, g1 to g5, h1 to h5, as shown in the figure. That is, the pixel memories 1105 to 1112 output image data for an area of 8 pixels in a vertical (sub-scanning) direction by 5 pixels in a horizontal (main scanning) direction at one time.

Figure 12:
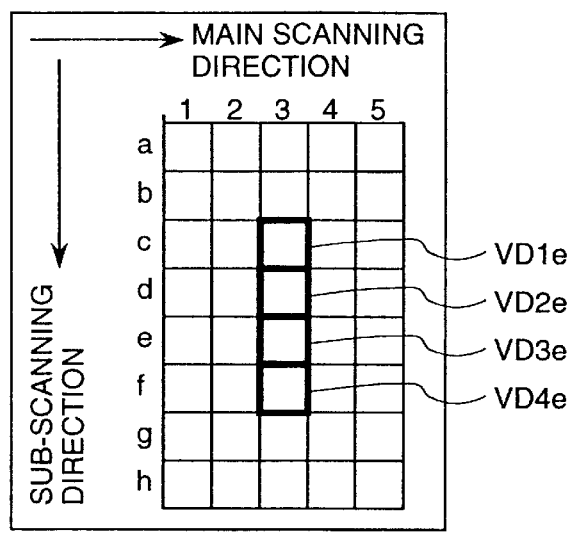
FIG. 12 is a matrix showing the relationship between output signals of the common line memory shown in FIG. 11 and positions on an image.

FIG. 12 shows positions on an image of image data. The image data signals a1 to a5, b1 to b5, c1 to c5, d1 to d5, e1 to e5, f1 to f5, g1 to g5, h1 to h5 output from the common line memory 101 at one time correspond to image data for an area of 8 vertical (a to h) pixels by 5 horizontal (1 to 5) pixels on an image as shown in the figure. In the figure, the positions of the pixels c3 to f3 to be printed by the laser beams (1) to (4) (reference pixels) are shown by bold lines, and the image data (laser modulating) signals to be used for smoothing the respective reference pixels are indicated by VD1e to VD4e.

Figures 17, 18:
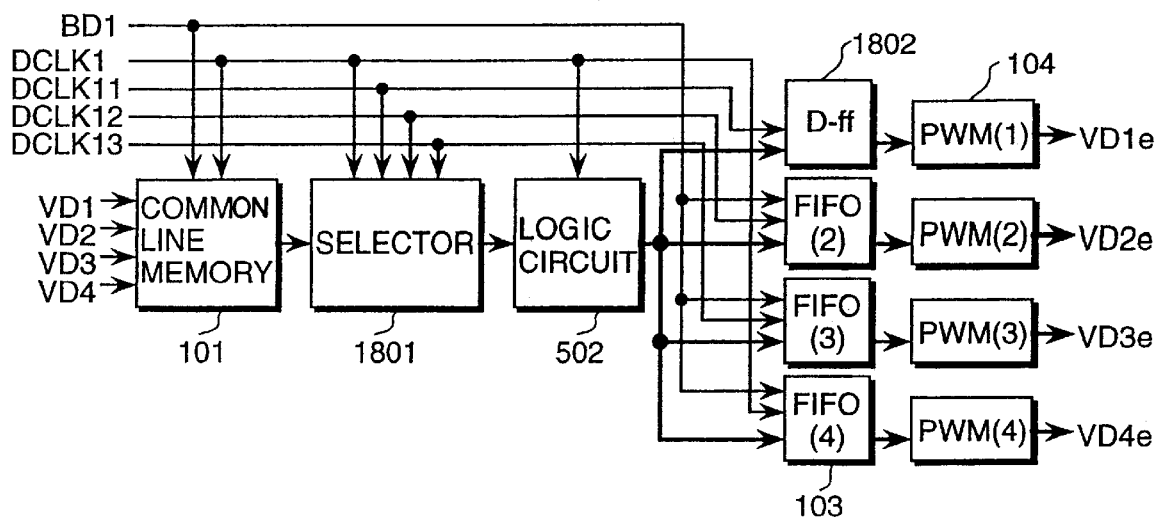
FIG. 17 is a table showing an example of patterns for edge smoothing.
FIG. 18 is a block diagram showing the construction of another embodiment of an edge smoothing circuit in an image printing apparatus in accordance with the present invention.

FIG. 17 shows an example of template patterns for edge smoothing relative to one reference pixel. Although various kinds of template patterns are proposed, only one example of a typical set of template patterns is shown here. In a case where an outline of a nearly vertical slanting line is corrected as shown by each of the template patterns before correction No. 1 to No. 4, a reference pixel in the center shown by bold lines is smoothed as shown in each of the laser modulated patterns after correction No. 1 to No. 4. In a case where an outline of a nearly horizontal slanting line is corrected as shown by each of the template patterns before correction No. 5 to No. 8, a reference pixel in the center shown by bold lines is smoothed as shown in each of the laser modulated patterns after correction No. 5 to No. 8. The laser modulated patterns show image data signals for smoothing, and actual printed patterns are appropriately smoothed by expansion of the beam spot of the laser beam.

Figure 13:
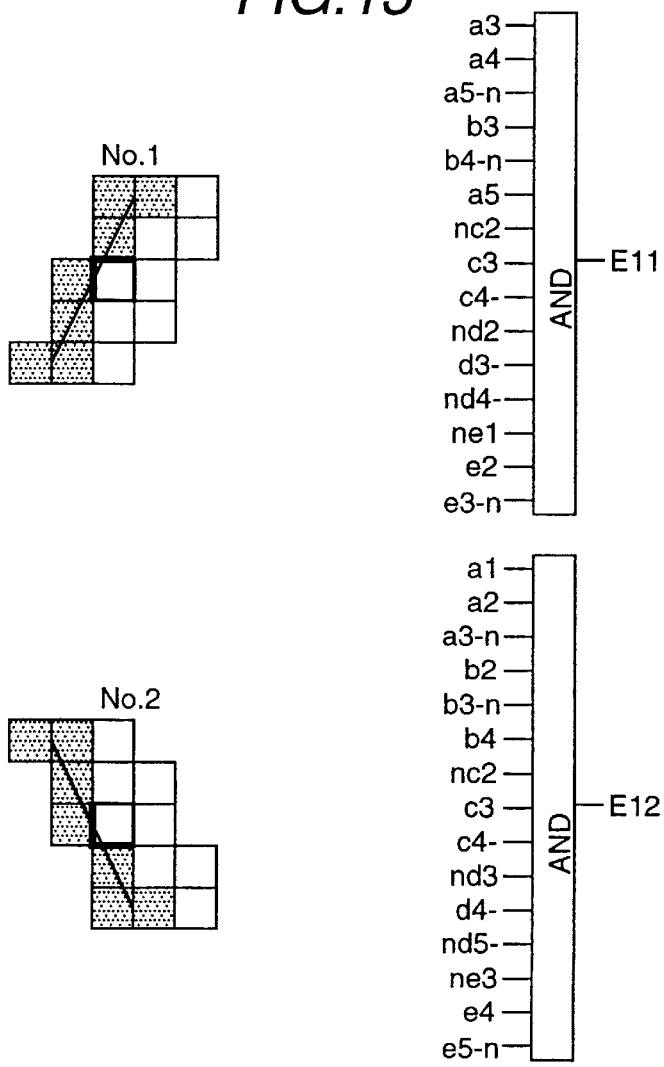
FIG. 13 is a diagram of detecting patterns and a block diagram of a logic circuit.

FIG. 13 shows examples of template patterns to be used for detecting patterns to perform smoothing in regard to one laser beam and a corresponding logic circuit. In order to make the explanation simple, only the template patterns to be used for detecting examples No. 1 and No. 2 among the template patterns shown in FIG. 17 are shown here, but the same principles can be applied to the other template patterns. AS shown in the figure, the logic circuit is composed of two 15-input AND (logical product) gates, which output pattern detected signals E11, E12 for the template patterns No. 1 and No. 2 to the PWM. Pattern detected signals E21, E22, E31, E32, E41, E42 for the template patterns No. 1 and No. 2 in regard to the other laser beams can be obtained by a similar circuit construction. The pattern detected signals are used as modulating data for generating laser modulating signals to modulate the lasers; using the PWM.

Figure 14:
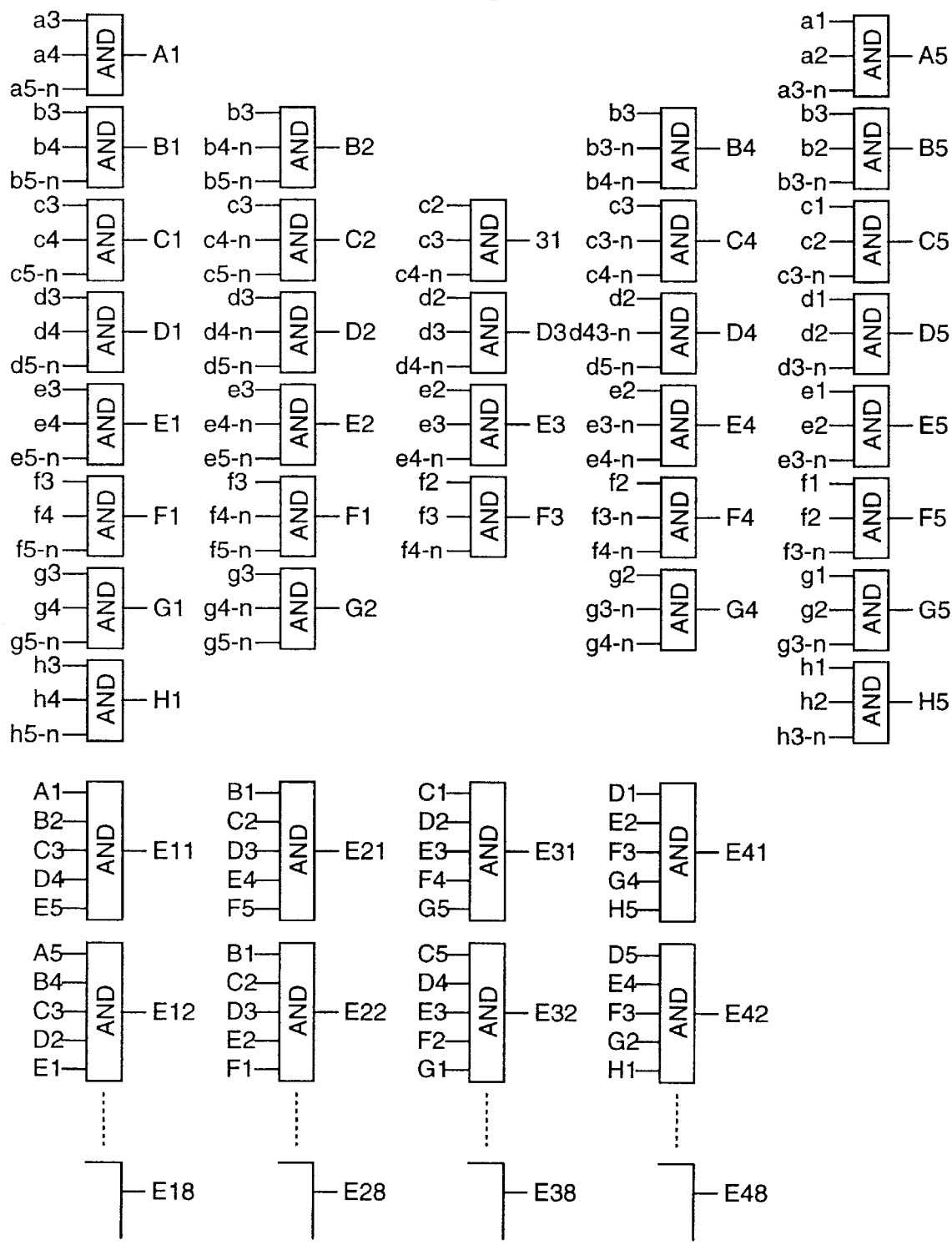
FIG. 14 is a block diagram showing the construction of a part of a logic circuit in an image printing apparatus in accordance with the present invention.

FIG. 14 is a block diagram showing the construction of a part of an embodiment of an improved common logic circuit 102 in regard to the laser beams (1) to (4). Only the template patterns No. 1 and No. 2 among the template patterns shown in FIG. 17 are shown as template patterns to be used for detecting patterns to perform smoothing, but the same principles can be applied to the other template patterns. The logic circuit (a part of the common logic circuit 102) is constructed by use of thirty-two 3-input AND (logical product) gates and four 5-input AND (logical product) gates, and generates pattern detected signals E11, E12, E21, E22, E31, E33, E41, E42 for the template patterns No. 1 and No. 2, and outputs them together with pixel data signals c3 (to f3) corresponding to the reference pixels to the PWM(1) and the FIFO(2) to FIFO(4) 104, as shown in FIG. 1. Therein, the suffix "-n" attached to some input signals of the logic gates indicates signals having a reversed polarity.

The common logic circuit 102 detects a template pattern for performing smoothing in regard to each of the reference pixels c3 to f3 by logically processing image data of an eight vertical pixel by five horizontal pixel area, as shown in FIG. 12, and generates pattern detected signals E11 to E18, E21 to E28, E31 to E38, E41 to E48 for generating laser modulating signals to perform smoothing of the corresponding reference pixels c3 to f3. To the image data output from, the common line memory 101, as shown in FIG. 11, the reference pixels c3 to f3 successively correspond to the image data signals VD3, VD4 to the laser beam (3), (4) in the upstream side in the sub-scanning direction output from the controller 601 in the preceding scanning cycle and the image data signals VD1, VD2 to the laser beam (1), (2) in the downstream side in the sub-scanning direction output from the controller 601 in the following scanning cycle.

Figure 15:
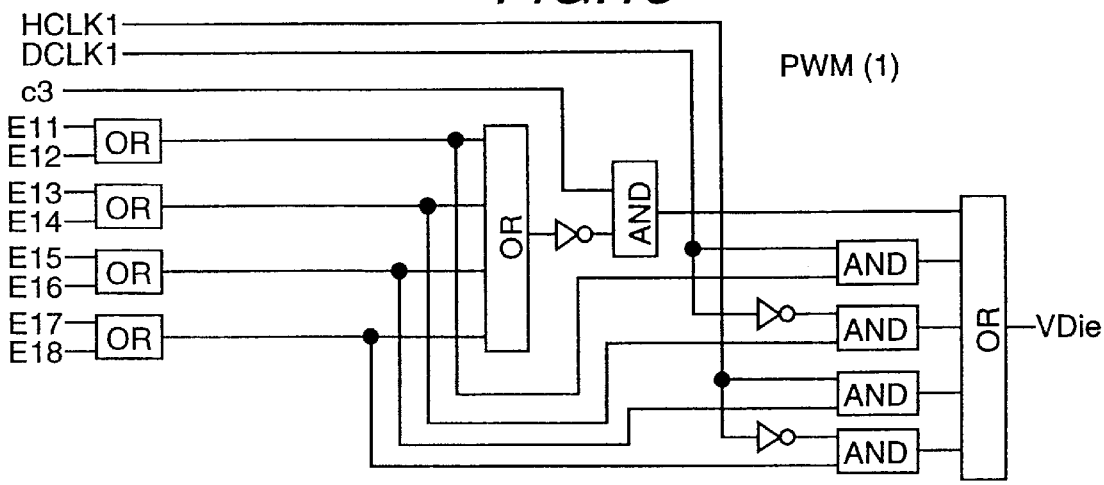
FIG. 15 is a block diagram showing the construction of a PWM circuit in an image printing apparatus in accordance with the present invention.

FIG. 15 is a block diagram showing an embodiment of the FIFO(2) to FIFO(4) 103 and PWM(L) to PNM(4) 104. The PWMI(1) is a circuit for the laser beam (1), and the FIFO(i) and the PWM(i) are provided for each of the laser beams (2) to (4). The circuits receive the image data of the reference pixels c3 to f3 and the pattern detected signals E11 to E48 detected by the common logic circuit 102, and generate the laser modulating signals VD1e to Vdie for pulse width modulating the flashing time of the laser beams in synchronism with respective scanning positions of the laser beams (1) to (4).

Figure 16:
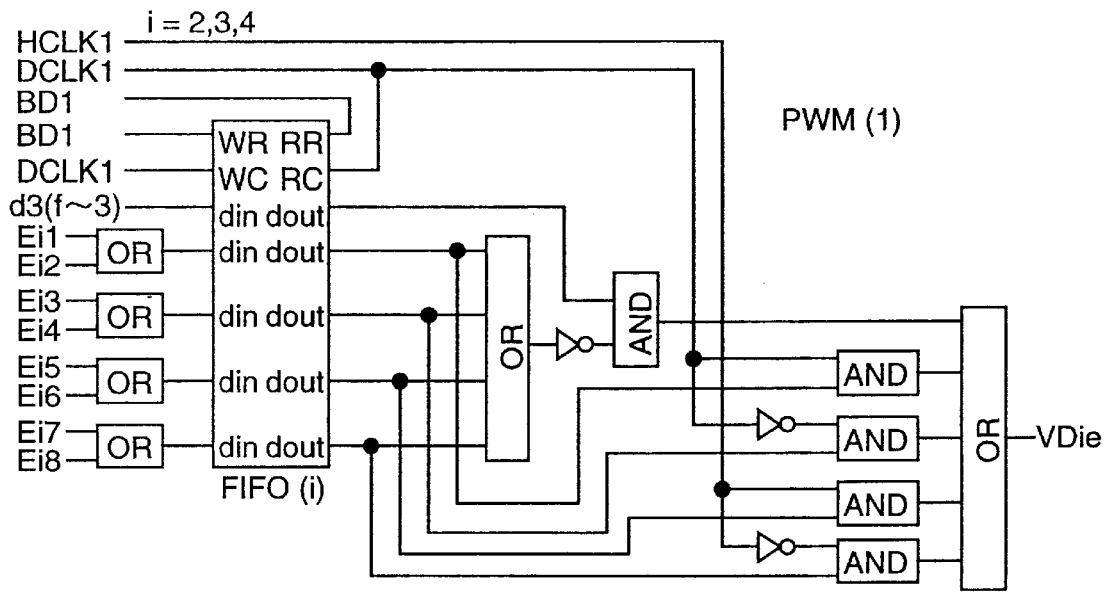
FIG. 16 is a table showing the relationship between pattern detected signal and output signal of the PWM circuit.

FIG. 16 shows the relationship between the pattern detected signals Ei1 to Ei8 and the output signals (laser modulating signals) Vdie from the PWM(i) (i=1, 2, 3, 4). When the pattern detected signal Ei1 or Ei2 becomes high-level, the output signal from the PWM is set to the output: signal Vdie of (2). When the pattern detected signal Ei3 or Ei4 becomes high-level, the output signal from the PWM is set to the output signal Vdie of (3). When the pattern detected signal Ei5 or Ei6 becomes high-level, the output signal from the PWM is set to the output signal Vdie of (4). When the pattern detected signal Ei7 or Ei8 becomes high-level, the output signal from the PWM is set to the output signal Vdie of (5). In the other cases, the output signal from the PWM is set to the output signal Vdie of (1), that is, no correction. To the laser beams (2) to (4), the reference pixel signals (d3 to f3) and the detected signals Ei1 to Ei8 are first stored in the FIFO(i). The FIFO(i) has the same construction as that of the line memory except for having a small memory capacity, and is controlled by the count clocks WC, RC and the reset signals WR, RR. Since it is sufficient when the memory capacity can store data corresponding to the number of pixels from a position in the main scanning direction of a beam spot 706 of the laser beam (1) to a position in the main scanning direction of a beam spot of each of the laser beams (i), a memory capacity of several tens is sufficient in this embodiment. The pixel clock signals DCLK1, DCLKi are input as the count clocks WC, RC. The line synchronous signals BD1, BDi are input as the reset signals WR, RR. Therefore, the PWM(i) following the FIFO(i) is operated in synchronism with the scanning position of each of the laser beam (i). Thereby, the corrections shown in FIG. 17 can be performed in synchronism with the position of each of the laser beams (i).

Figure 20:
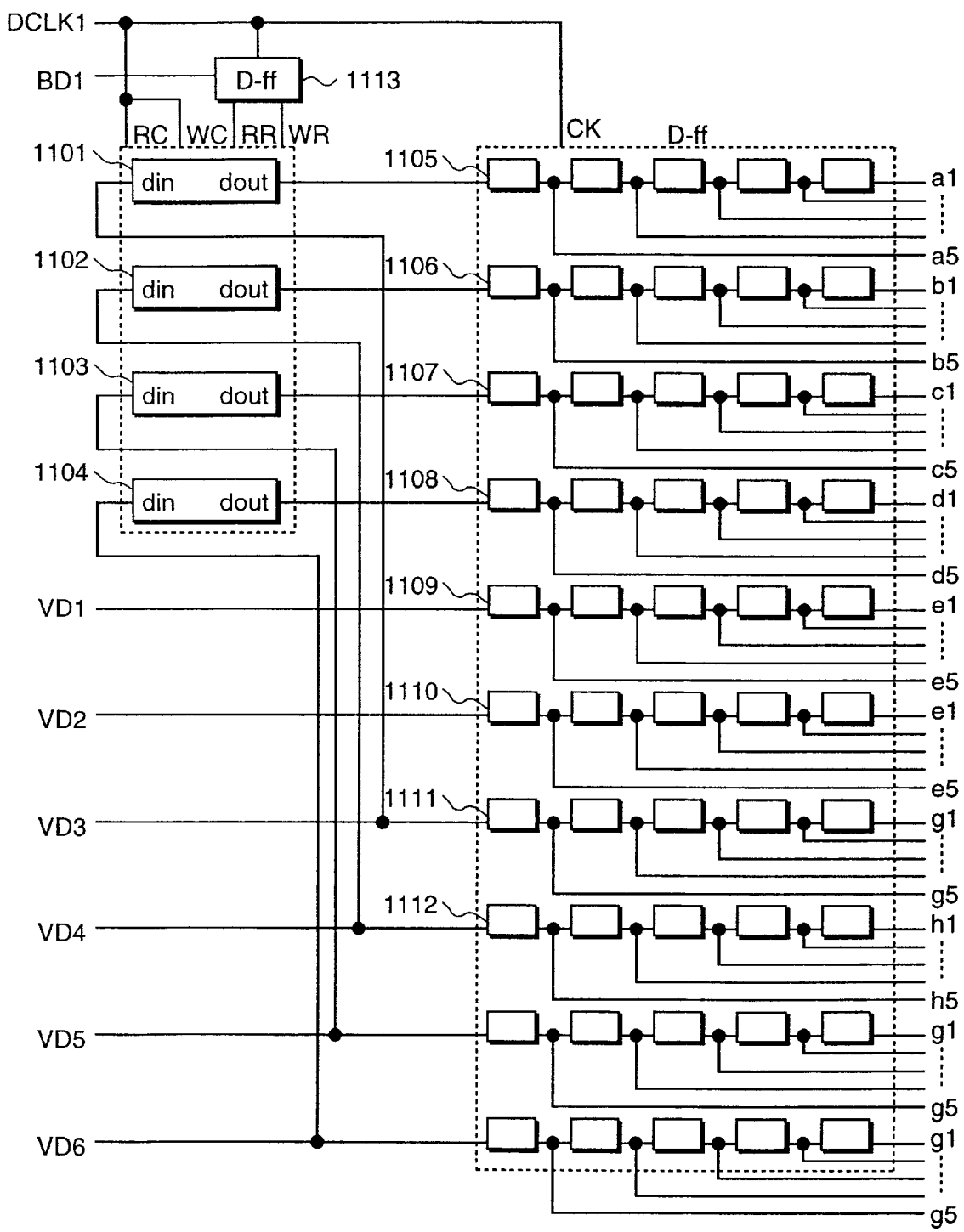
FIG. 20 is a block diagram showing the construction of an embodiment 1 of the common line memory of FIG. 11.
Figure 21:
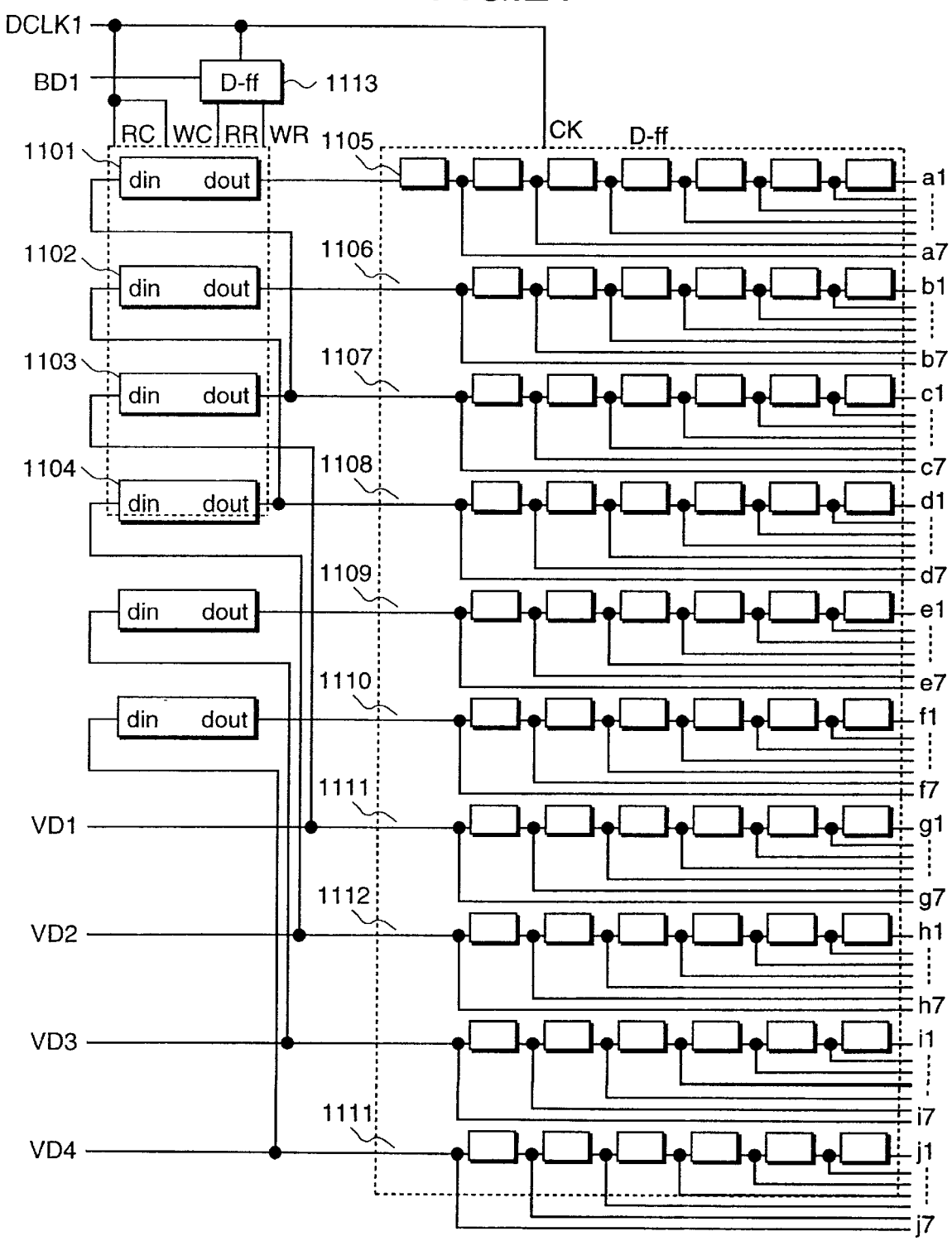
FIG. 21 is a block diagram showing the construction of an embodiment 2 of the common line memory of FIG. 11.

According to this embodiment, the number of line memories in the common line memory can be made small. In a case where the template pattern for detecting a pattern to perform smoothing spreads over 5 scanning lines in the sub-scanning direction, as shown in FIG. 17, it is sufficient if the number of the line memories can cover 4 scanning lines, which is how many laser beams are used to print in parallel. In a case where the template pattern for detecting a pattern to perform smoothing corresponding to that in FIG. 17 spreads over n scanning lines, it is sufficient if the number of the line memories 101 can cover n−1 scanning lines. For example, FIG. 20 shows a case of a common line memory where the same smoothing template patterns are used and the number of the laser beams 101 for printing in parallel is increased from 4 to 6 in the common line memory shown in FIG. 11. The number of the pixel memories is increased, but the number of the line memories having a large capacity is not increased. On the contrary, FIG. 21 shows the case of a common line memory where the number of the laser beams 101 for printing in parallel is the same and the smoothing template patterns are changed from 5 scanning lines to 7 scanning lines in the common line memory shown in FIG. 11. In this case, the number of the line memories is increased from 4 scanning line sets to 6 scanning line sets. However, the size of the template in edge smoothing is generally unchanged. Since the number of line memories 101 is unconnected with the number of laser beams 701 used for printing in parallel, the circuit in accordance with the present invention cannot become complex even if the number of the laser beams 701 printing in parallel is increased in order to obtain a high speed and high definition image printing apparatus.

The scale of the logic gates of the common logic circuit 102 can be reduced. When a conventional logic circuit as shown in FIG. 13 is independently provided for each laser beam, the circuit scale becomes large. However, according to this invention, the scale becomes small as shown in FIG. 14, because the logic gates are commonly used. In this embodiment, the FIFOs(2) to (4) 103 are inserted between the logic circuit 102 and the PWMs(2) to (4) so that the common line memory 101 in the upstream side and the common logic circuit 102 do not become complex, even if the number of laser beams is increased. However, the FIFOs 103 may be inserted in a further upstream side.

Figure 19:
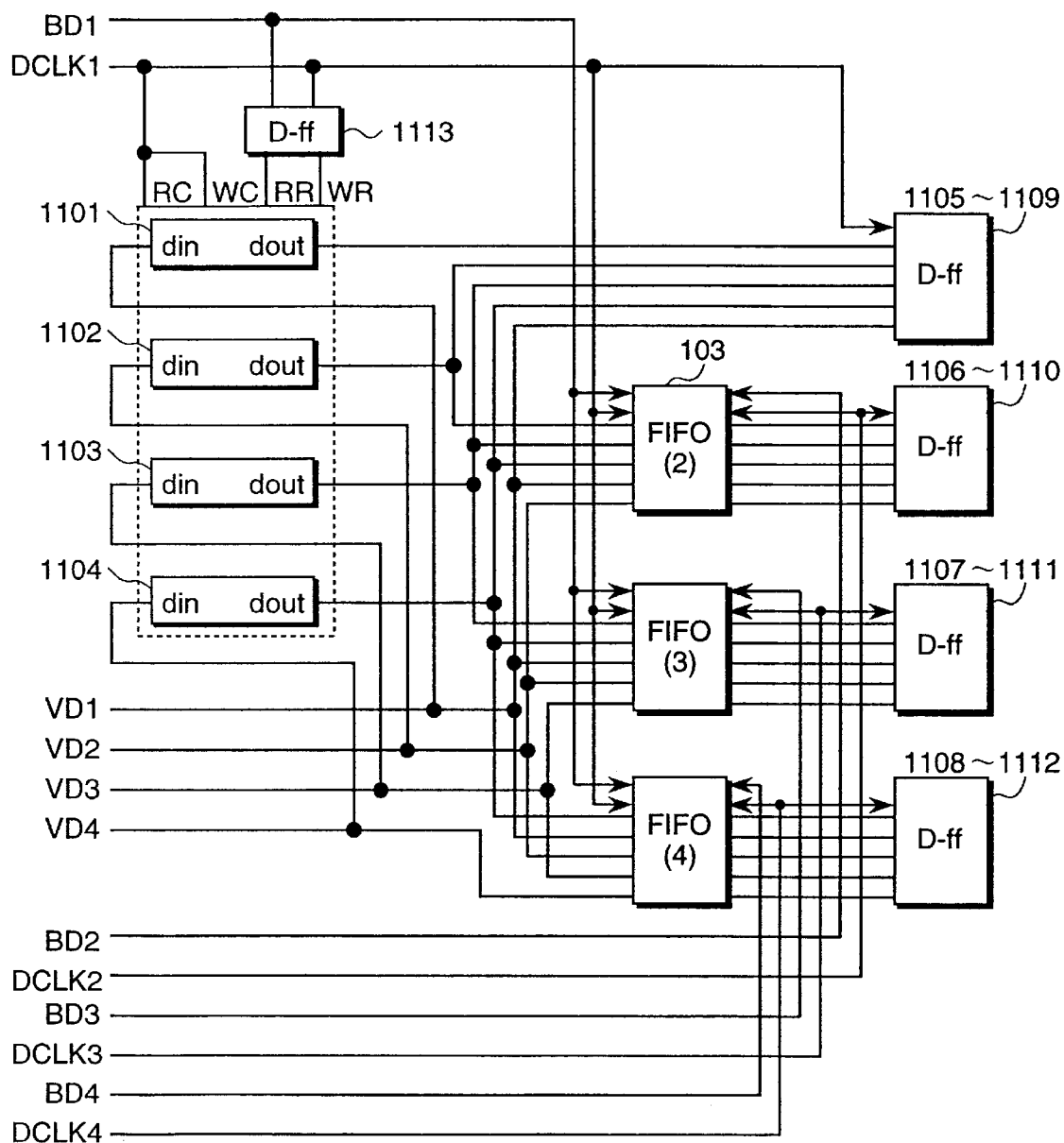
FIG. 19 is a block diagram showing the construction of another embodiment of a common line memory in an image printing apparatus in accordance with the present invention.

FIG. 19 shows an embodiment where the FIFOs 103 are inserted between the line memories 1102 to 1104 in the common line memory 101 and the pixel memories 1106 to 1112. In this construction, only the line memories 1101 to 1104 on the upstream side are used in common. To the pixel memories 1105 to 1112 on the downstream side and the following, logic circuits and PWMs as in the printing apparatus using one laser beam as shown in FIG. 5 are independently provided for the respective laser beams. In this embodiment, only the line memory is simplified. However, in a case where the line memory is contained in a higher level controller, the construction can easily expand its function because chips having the same construction can be repeatedly used on the downstream side.

FIG. 18 is a block diagram showing the construction of another embodiment of an edge smoothing circuit 603 in an image printing apparatus in accordance with the present invention. This embodiment shows a construction in which one logic circuit is time shared in image data processing for four laser beams when the logic circuit 502 to one laser beam shown in FIG. 5 has a performance capable of operating four times as fast as its printing speed. Clock signals delayed to the pixel clock signal DCLK1 by 90 degrees, 180 degrees and 270 degrees on a phase basis are generated as pixel clock signals DCLK11, DCLK12, DCLK13.

As the pixel clock signal DCLK1 rises, a selector 1801 selects output signals a1 to a5, b1 to b5, c1 to c5, d1 to d5, e1 to e5 of the common memory 101 to output to the logic circuit 502 constructed so as to process image data for one laser beam. The logic circuit 502 outputs a logic processed result before the pixel clock signal DCLK11 rises.

Then, with the rising of the pixel clock signal DCLK11, a D-ff 1802 stores the logic processed result, and the selector 1801 selects output signals b1 to b5, c1 to c5, d1 to d5, e1 to e5, f1 to f5 of the common memory 101 to output to the logic circuit 502. The logic circuit 502 outputs the logic processed result before the pixel clock signal DCLK12 rises.

Then, when the pixel clock signal DCLK12 rises, the FIFO(2) stores the logic processed result, and the selector 1801 selects output signals c1 to c5, d1 to d5, e1 to e5, f1 to f5, g1 to g5 of the common memory 101 to output to the logic circuit 502. The logic circuit 502 outputs the logic processed result before the pixel clock signal DCLK13 rises.

Then, when the pixel clock signal DCLK13 rises, the FIFO(3) stores the logic processed result, and the selector 1801 selects output signals d1 to d5, e1 to e5, f1 to f5, g1 to g5, h1 to h5 of the common memory 101 to outputs to the logic circuit 502. The logic circuit 502 output the logic processed result before the pixel clock signal DCLK11 rises.

Then, when the pixel clock signal DCLK1 rises, the FIFO(4) stores the logic processed result.

The D-ff 1802, the FIFOs(2) to (4) and the following circuits are constructed so as to operate in synchronism with the scanning positions of the respective laser beams.

According to this embodiment, the circuit is more simplified because the logic circuit has a circuit for only one laser beam. Further, the logic circuit does not become complex because the logic circuit itself has a circuit for only one laser beam even if the number of laser beams is increased.

In an image printing apparatus for printing a plurality of scanning lines (images) in parallel using a plurality of laser beams, the image printing apparatus in accordance with the present invention performs an edge smoothing. Although embodiments which perform edge smoothing using a controller similar to the conventional controller have been described, the four line memories 1101 to 1104 can be eliminated from the edge smoothing circuit 603 if the controller 601 is constructed in such a way that the image data signals VD of the scanning lines necessary for logic processing for edge smoothing are output in parallel. For example, in a case where edge smoothing for four scanning lines is performed by logically processing the image data signals of 8 vertical pixels by 5 horizontal pixels, the common logic circuit 102 uses image data signals of 5 pixels for each of 8 scanning lines, as shown in FIG. 12. Therefore, by constructing the controller 601 so as to output image data signals for eight scanning lines in parallel, the line memories 1101 to 1104 can be omitted. Since only four scanning lines are used for parallel printing in this case on the inner side (the image data signals VD−1, VD−2, VD+1, VD+2 of two scanning lines in the both sides each are used for only logic processing), the controller 601 needs to be constructed so that image data signals for the eight scanning lines in the positions moved toward the upstream side in the subscanning direction by four scanning lines are output in parallel in the next scanning cycle.

The controller 601 outputting eight scanning lines of image data signals in parallel, as described above, has line memories for eight scanning lines contained in the reading-out circuit of bit map memory expanding image data, and the image data signals for eight scanning lines are output in parallel by the same method as in the conventional controller. Thus, it is possible to update the reading-cut positions by four scanning lines in every scanning cycle.

What is claimed is:

1. An image printing apparatus comprising a control circuit for generating a plurality of laser modulating signals which respectively control a plurality of laser beams based on image data for a plurality of scanning lines, said plurality of scanning lines being printed in parallel using said plurality of laser beams and including:

memory means for storing said image data for said plurality of scanning lines in synchronism with respective scanning positions of said plurality of laser beams and which is read out in synchronism with a common scanning position of one of said plurality of laser beams;

a logic circuit for generating laser modulating data for said plurality of scanning lines to control said plurality of laser beams based on said image data for said plurality of scanning lines and pre-stored template patterns in synchronism with said common scanning position;

a First-In-First-Out (FIFO) memory for storing said laser modulating data for said plurality of scanning lines in synchronism with said common scanning position, and for reading out said stored laser modulating data in synchronism with respective scanning positions of said plurality of laser beams; and a laser modulator for generating said laser modulating signals for said plurality of scanning lines based on said laser modulating data in synchronism with said respective scanning positions of said plurality of laser beams.

2. An image printing apparatus according to claim 1, wherein said memory means comprises:

a line memory for storing image data having a member of scanning lines and for outputting said image data width a delay of several scanning cycles, said number being smaller than the number of scanning lines of said template pattern by one; and a pixel memory for storing said obtained image data for said plurality of scanning lines and said image data output from said line memory by a plurality of pixels each.

3. An image printing apparatus according to claim 2, wherein said pixel memory stores said image data for a number of pixels in a main scanning direction necessary for said template pattern.

4. An image printing apparatus according to any one of claim 2 and claim 3, wherein said line memory and said pixel memory in said memory means store and read out said image data in synchronism with said common scanning position of one of said plurality of laser beams.

5. An image printing apparatus according to claim 2, wherein said logic circuit generates said laser modulating data by logically operating on said image data stored in said pixel memory.

6. An image printing apparatus according to claim 1, wherein said logic circuit comprises an edge smoothing circuit which generates said laser modulating data by performing logic processing of said image data for controlling said plurality of laser beams to print in parallel, wherein said image data for said plurality of scanning lines is within a predetermined adjacent range which has been obtained for at least one previous scanning cycle represented by a line number of said template patterns subtracted with one line.

7. An image printing apparatus comprising a control circuit for generating a plurality of laser modulating signals which respectively control a plurality of laser beams based on image data for a plurality of scanning lines, said plurality of scanning lines being printed in parallel using said plurality of laser beams, and including:

memory means for storing said image data for said plurality of scanning lines in synchronism with respective scanning positions of said plurality of laser beams and which is read out in synchronism with a common scanning position of one of said plurality of laser beams;

a logic circuit common to said plurality of scanning lines for generating laser modulating data to control said plurality of laser beams based on said image data for said plurality of scanning lines and pre-stored template patterns;

selecting means for selectively supplying said image data stored in said memory means to said logic circuit to generate said laser modulating data;

a First-In-First-Out (FIFO) memory for selectively storing said laser modulating data for said plurality of scanning lines in synchronism with said common scanning position, and for reading out said laser modulating data for each of the scanning lines in synchronism with each scanning position of said plurality of laser beams; and a laser modulator for generating said laser modulating signals for printing each of said scanning lines based on said laser modulating data for each of said plurality of scanning lines.

8. An image printing apparatus according to claim 7, wherein said selecting means and said FIFO memory for storing and reading out the laser modulating data are operated in synchronism with pixel clock signals for respective scanning lines having phase differences.

\* \* \* \* \*